United States Patent [19]

Peltsman et al.

[11] 4,416,603

[45] Nov. 22, 1983

[54] LOW PRESSURE HOT MOLDING MACHINE

[76] Inventors: Michael I. Peltsman; Israel D. Peltsman, both of 1646 Hampshire Ave. South, Minn. 55426

[21] Appl. No.: 309,238

[22] Filed: Oct. 7, 1981

[51] Int. Cl.[3] .................... B29F 1/06

[52] U.S. Cl. .................... 425/153; 425/144; 425/159; 425/546; 425/589; 425/551

[58] Field of Search ............... 425/542, 153, 159, 557, 425/569, 209, 144, 546, 589, 551; 366/97, 98, 205, 314; 264/102

[56] References Cited

U.S. PATENT DOCUMENTS

| | | | |
|---|---|---|---|
| 2,758,623 | 8/1956 | Molz et al. | 366/205 |
| 3,356,130 | 12/1967 | Mellen, Jr. et al. | 425/153 |
| 3,386,133 | 6/1968 | Weiner | 425/153 |
| 3,540,234 | 11/1970 | Raymond | 366/205 |
| 3,599,282 | 8/1971 | Meyers et al. | 425/159 |
| 3,638,673 | 2/1972 | Stanciu | 137/205 |
| 3,674,398 | 7/1972 | Baumgartner et al. | 425/159 |
| 3,843,293 | 10/1974 | Harville | 425/243 |
| 4,036,922 | 7/1977 | Ho et al. | 264/102 |
| 4,302,171 | 11/1981 | Peltsman et al. | 425/140 |

FOREIGN PATENT DOCUMENTS

| | | | |
|---|---|---|---|
| 199737 | 9/1967 | U.S.S.R. | 425/551 |

OTHER PUBLICATIONS

P. O. Gribovsky, *Hot Molding of Ceramic Parts*, p. 222, 1961.

*Primary Examiner*—Thomas P. Pavelko

*Attorney, Agent, or Firm*—Kinney, Lange, Braddock, Westman and Fairbairn

[57] ABSTRACT

A ceramic molding machine is used for hot molding ceramic parts under low pressures for small part production molding and includes a heated tank that is generally conical in shape and has an internal mixer that is driven from the exterior of the tank through a slip clutch arrangement to avoid overloading of the drive motor. The conical tank insures that the ceramic slurry will flow toward the bottom outlet from the tank and also permit use of small amounts of slurry for small runs of parts if the material is expensive. The mixer blade or paddle is driven from the bottom and removable from the top and thus the tank can easily be serviced. Additionally, air pressure is utilized for holding the molds in position over the feeder pipe and also for transferring the slurry to the mold in a timed sequence that can be controlled to provide the desired time for filling of the mold.

19 Claims, 5 Drawing Figures

Fig. 5
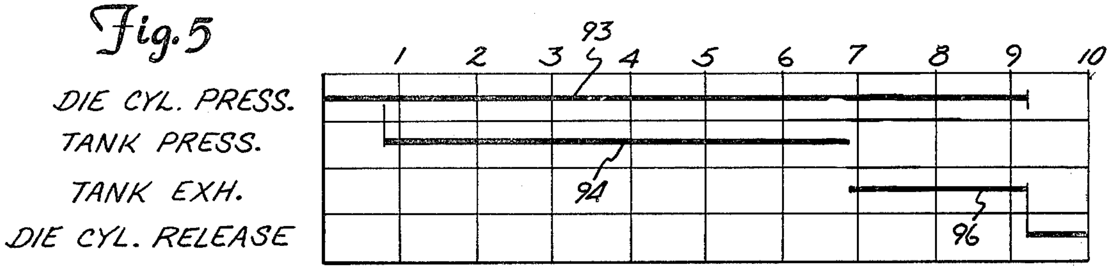
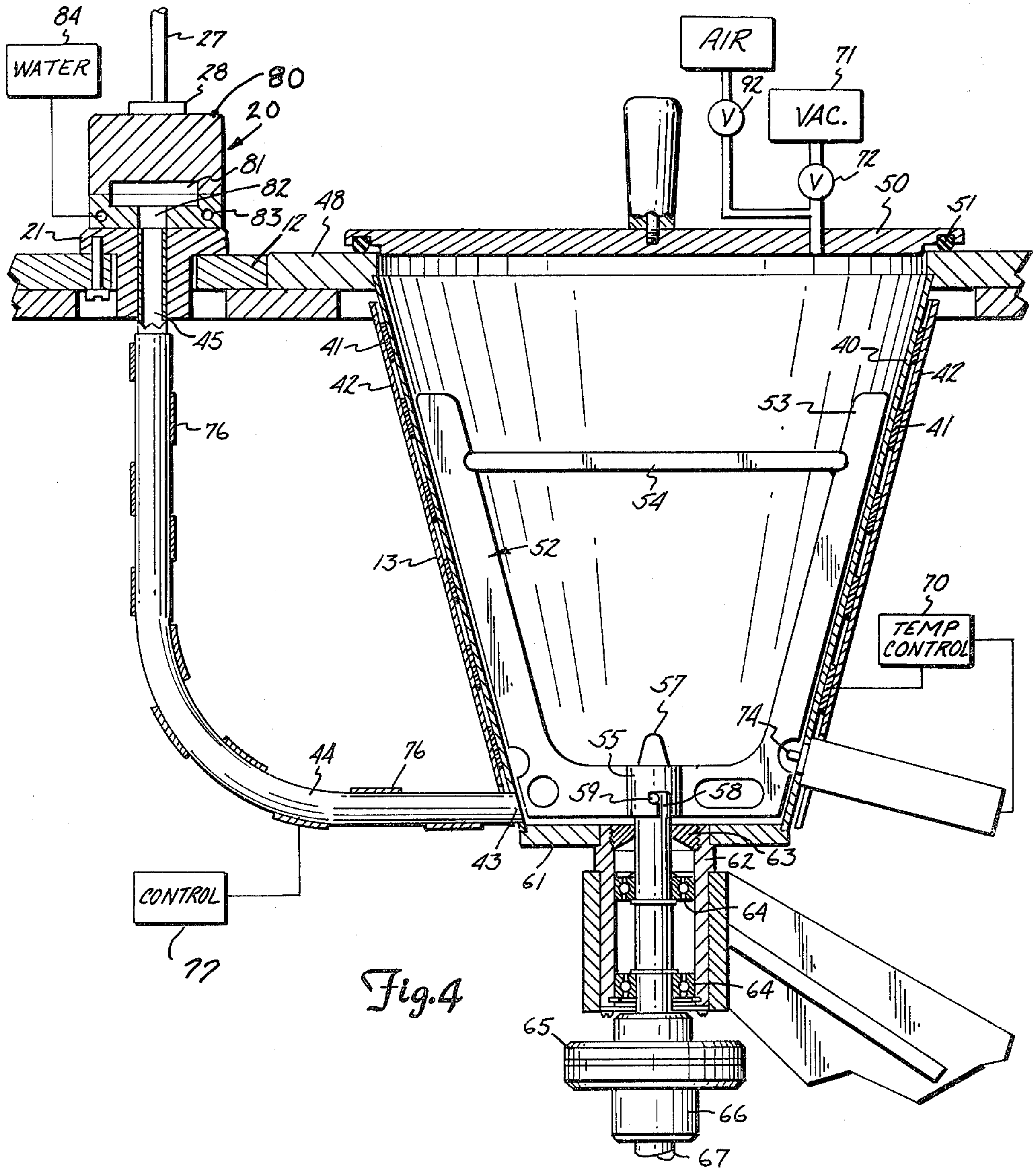
Fig. 4

LOW PRESSURE HOT MOLDING MACHINE

BACKGROUND OF THE INVENTION

1. Field of the Invention

The present invention relates to hot molding machines for molding parts from ceramic slurries under low pressures.

2. Description of the Prior Art

Hot ceramic slurry molding machines that operate under low pressure have been known in the past. In one such prior art machine, a cylindrical tank subjected to air pressure is used to fill molds. A provided table is cooled with water and the mold holding the finished part is placed on the table for cooling. However, the heated tank was not provided with a mixer paddle, and thus there is no drive to the mixer paddle that utilizes a slip clutch. The device did use air pressure in the heated tank for forcing the slurry into the mold, in a manually operable cycle.

U.S. Pat. No. 3,638,673 discloses a wax melting and conditioning apparatus utilizing a mixer blade having a bottom drive, but which does not have a removable blade member.

U.S. Pat. No. 3,952,538 shows a mixer for freezing liquids such as ice cream, that has a removable center agitator or blade. The housing shown is slightly conically shaped, but it is not a unit utilized for moving material into a forming mold under air pressure.

U.S. Pat. No. 3,843,293 shows a molding machine for molding plastic materials using an air pressure tank that has a valve at the bottom that permits the molted plastic material to pass from the container to the mold. The tank itself is heated to keep the material in its plastic state.

U.S. Pat. No. 2,573,693 includes a rotating mold for forming hollow articles. The mold rotates as molten plastic is added to the mold interior.

SUMMARY OF THE INVENTION

The present invention relates to a low pressure ceramic molding machine having a tank that is generally conically shaped with an interior agitator inside the tank and heating means for keeping the material inside the tank in a slurry form. The slurry is a nonaqueous slurry using a paraffin or similar base. Air under relatively low pressure is provided on the interior of the tank to urge material through a conduit or feed pipe into a mold that is supported on the assembly and held in place by a pneumatic cylinder.

The tank contains a mixer member that rotates about a central axis and is driven by a motor on the outside and below the tank. This permits the mixer member to be easily removed and replaced merely by taking the cover off the tank. The drive to the mixer member is through a slip clutch to avoid overloading drive motor when the slurry viscosity is too high.

The present device thus makes a low cost, easily operated molding machine for semi automatic operation. The entire operation is interlocked with a timer, to insure safety as well. The timer sequence insures that the mold or die is closed and held in place, pressure then is provided to the tank to fill the mold, and the air is exhausted from the tank, after which the air cylinder holding the mold in place is released.

BRIEF DESCRIPTION OF THE DRAWINGS

FIG. 4 is a vertical sectional view of a molding tank made according to the present invention; and FIG. 5 is a timing diagram used when the automatic cycle is initiated in the device.

DETAILED DESCRIPTION OF THE PREFERRED EMBODIMENT

Figure 1:
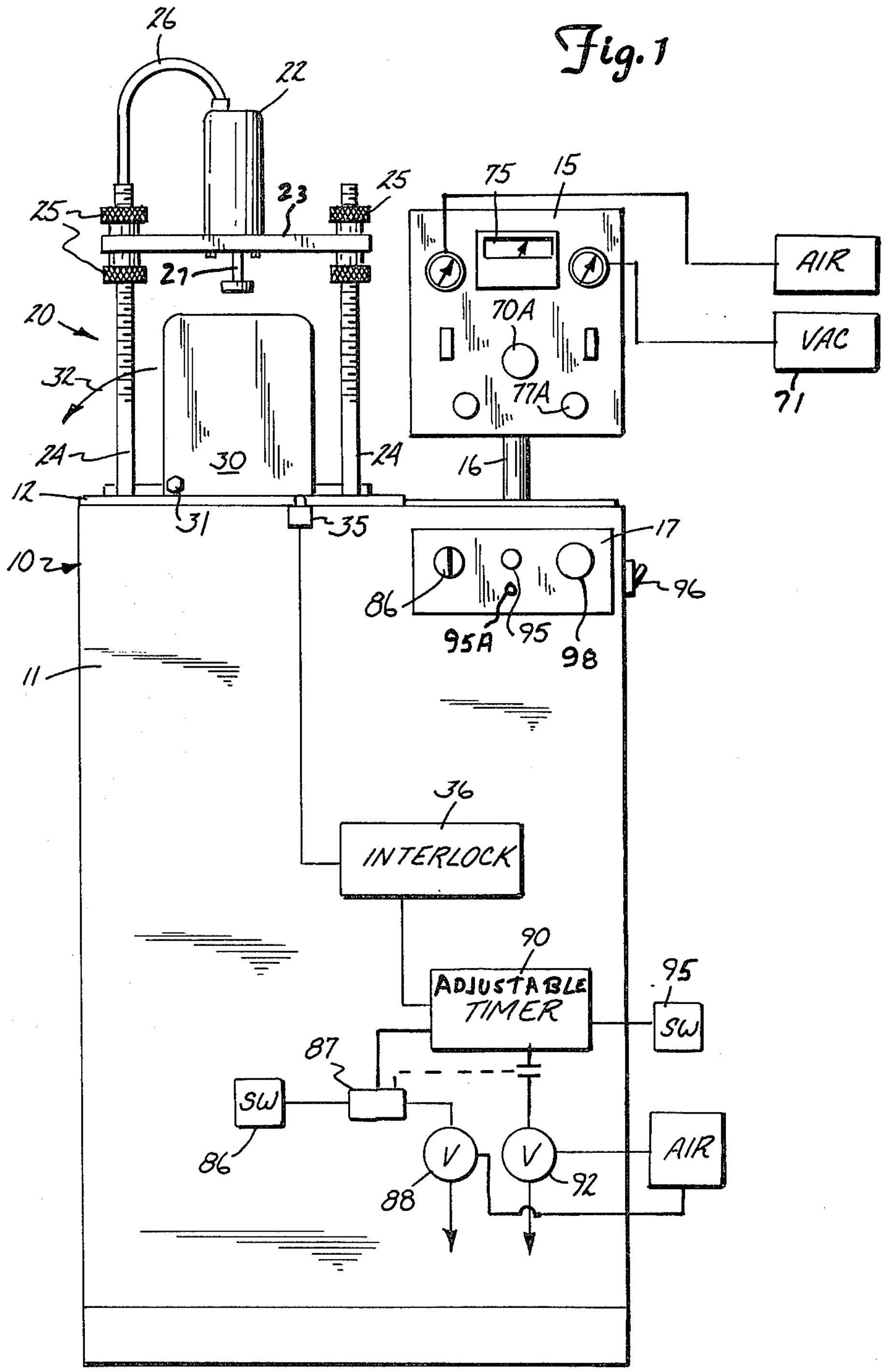
FIG. 1 is a front view of a molding machine made according to the present invention illustrating schematically controls utilized in association therewith.
Figure 2:
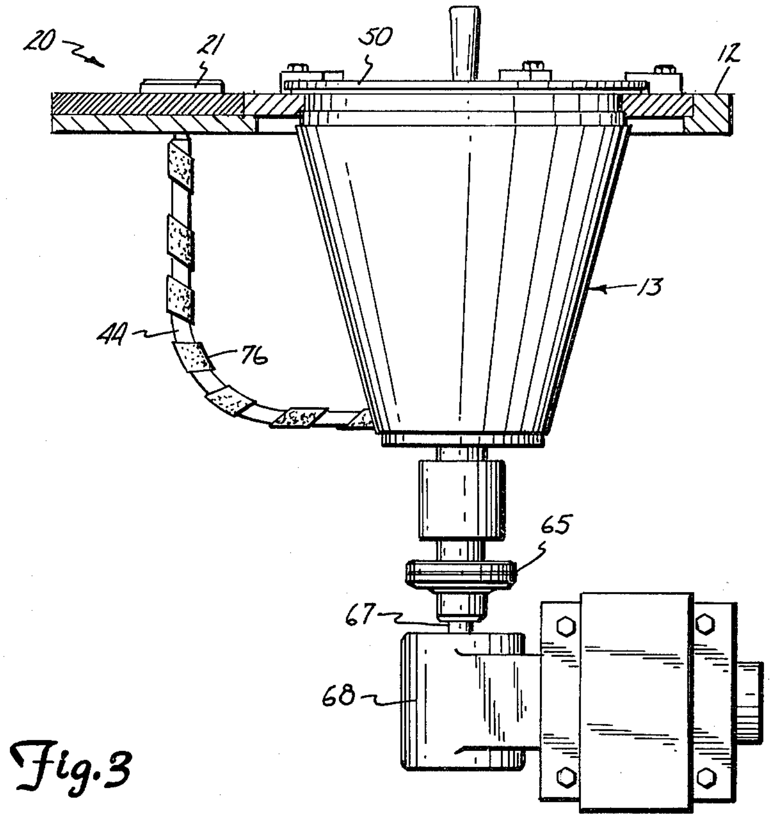
FIG. 2 is a side view of the molding tank, transfer pipe, and drive arrangement with the cabinet removed for sake of clarity.

Referring to FIG. 1, a ceramic molding machine 10 made according to the present invention is illustrated and includes an outer housing or cabinet 11, which supports a plate 12. The plate 12 is shown in FIG. 2 and is supported suitably to comprise a frame for supporting a molding material tank assembly 13, which comprises a mixing and transfer tank for nonaqueous or nonwater containing ceramic slurries using generally a paraffin type binder. The tank assembly 13 is suitable mounted on the plate 12, and is positioned within the cabinet 11 as shown. A control panel housing 15 is mounted on a suitable support 16 above the plate 12 and additional controls 17 are mounted on the front panel of the cabinet within easy reach of an operator.

A molding station 20 is provided to one side of the control cabinet 15, and includes as shown in FIG. 2 a mold support fitting 21 that provides an outlet opening as will be explained for the ceramic slurry to enter into a mold that is held in place on the fitting 21.

The station 20 thus includes means for supporting a mold or die in position and clamping it over the mold fitting 21 including a single acting, spring return pneumatic cylinder 22 that is supported on a cross bar 23 aligned with the opening in the mold fitting 21, and held on a pair of upright columns 24, the columns 24 in turn are fixed to the plate 12 in a suitable manner and have elongated threaded sections near the upper portion thereof for permitting adjustment of the cross bar 23 through the use of adjustment nuts 25. The pneumatic or air cylinder 22 is connected to an air source through one of the columns 24, which is tubular, and has an air conduit 26 extending from the upper end thereof to the inlet port of the pneumatic cylinder 22. The pneumatic cylinder 22 includes an actuating rod 27 having a pressor foot 28 thereon which will engage a mold and when energized the rod 27 extends to press a mold against the mold fitting 21, as will be explained.

A safety shield 30 which as shown is clear plastic is pivotally mounted as at 31 on a suitable support to the plate 12 and will move about this pivot 31 in direction as indicated by the arrow 32 from its closed position, in position for molding as shown in FIG. 1, to an open position wherein access to the molding station can be substantially unrestricted. The shield 30 folds out approximately 180° during operation.

The shield in its home or closed position as shown in FIG. 1 contacts a switch 35 which energizes a suitable interlock relay 36 that will cut off power to desired components such as control valves to prevent operation of various components in the molding sequence for safety purposes until the shield 30 is closed. The interlock can be of any desired configuration well known to people skilled in the control field, and thus is shown only schematically.

Referring specifically to FIGS. 2 and 4, the tank assembly 13 as shown has a conical inside tank portion 40, which is surrounded with flexible electrical heaters 41 that are spiraled around the tank, and a layer of insulation 42 is placed over the heaters if desired. The tank has an outlet opening 43 leading to a feeder pipe 44 that connects to the mold fitting 21 and provides a passageway for material into the molding passageway 45 centered in the block.

Figure 3:
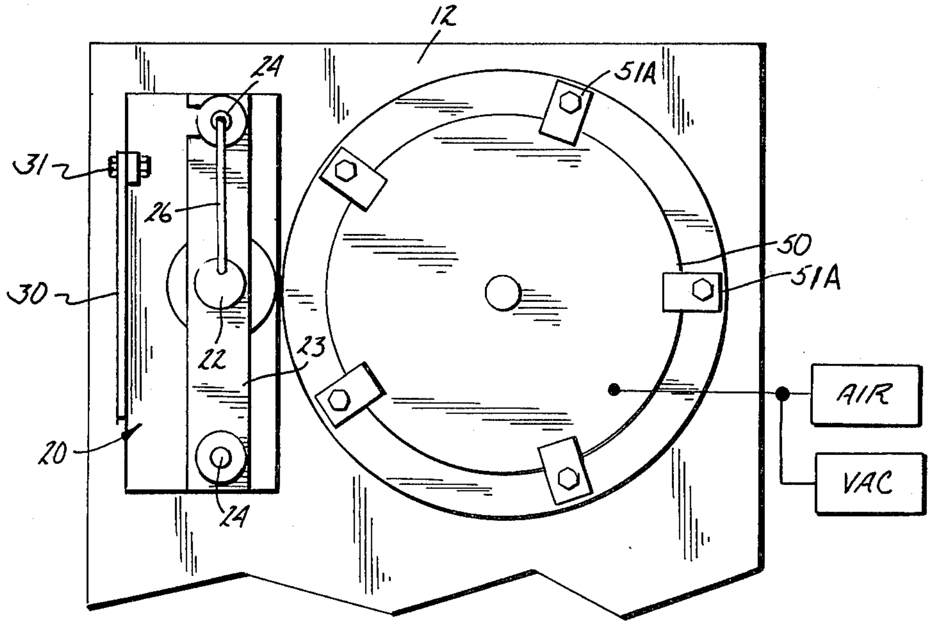
FIG. 3 is a top plan view of the device of FIG. 1.

The mold fitting 21 as shown is fixed to the plate 12, and the tank 13 is also mounted securely to the plate 12 with the mounting flange 48. The tank assembly 13 has a cover 50 that has a lift handle and is suitably sealed with a suitable sealing ring 51 as shown, and clamped into place with suitable clamps shown schematically in FIG. 3 at 51A. These clamps can be screw type clamps or other type clamps that are suitable for the pressures involved.

A mixer or agitator paddle member indicated at 52 is mounted inside the tank portion 40 and as shown comprises a plurality of upwardly extending paddles 53 that are spaced apart in annular direction (there may only be two as shown) and which may be braced with a suitable brace 54. The outer edges of the blades 53 are inclined at the same angle as the conical inside surface of the tank portion 40 and a hub 55 is provided at the bottom to support the blades 53. The hub can be, as shown, a twist lock hub that mounts over a drive shaft 57 and has a suitable twist lock aperture 58 that permits a drive pin or key 59 to be inserted into the aperture or passageway 58 in a downward direction, and then twisted 90° to lock it into place for driving from the drive shaft 57.

The drive shaft 57 as shown is only a stub shaft that extends into the tank portion 40 a short distance and extends through a bottom plate 61 of the tank portion. A suitable housing 62 is mounted on this bottom plate and a seal member indicated at 63 can be provided to prevent air from being sucked into the tank around the shaft 57 when the tank is subjected to vacuum. The hub 62 in turn houses bearings 64 for mounting the shaft, and the lower end of the drive shaft is mounted to the output end of a torque limiting clutch 65. The torque limit clutch can be of any desired design, usually a friction disc clutch, comprising a torque limiting clutch means that will limit the amount of torque that can be exerted through the shaft 57 from the input end of the clutch indicated at 66. The input end 66 of the clutch in turn is connected to a drive shaft 67 to a suitable electric motor 68 that can be mounted on the frame or housing of the molding machine.

As stated before the tank assembly 13 has a heated inner tank portion 40 that has conical outer walls, and as can be seen this is a truncated cone having a flat bottom plate 61. Additionally, the tank assembly is sealed with the cover 50 in a suitable manner so that the interior of tank portion 40 can be subjected to either vacuum or air pressure. In the initial mixing the flexible heaters 41 can be energized from a suitable power source through a temperature controller shown schematically at 70 so that ceramic mixes which are solid at room temperature can be inserted into the tank through the cover 50 and then heated by the flexible heaters 41. During the time that the ceramic materials are melting, the agitator paddle member 52 may be driven by energizing the motor 68. However, the mixing normally takes place after the ceramic mix has been heated to form a slurry.

During the time of mixing, a suitable vacuum source indicated at 71 can be connected through a suitable valve to the interior of the tank portion 40. The connection can be through the cover 50 if desired or through the side wall of the tank portion 40 with any desired fitting. This is shown schematically in FIG. 4, and the vacuum control can be through a suitable solenoid valve 72. The vacuum is provided to the interior of the tank portion 40 during the mixing operation to remove all air bubbles so that the slurry is thoroughly mixed and does not have any entrained air in it. The passageway 45 leading to mold fitting 21, which comprises the outlet of the feed pipe 44, can be closed if desired by a plug member.

Once the mixing of ceramic material has progressed satisfactorily, so that the slurry is thorougly mixed and is at the desired temperature, as sensed by a temperature sensor 74 provided through the side wall of the tank portion 40 the molding operations can start. A temperature indicator shown at 75 in FIG. 1 will indicate the slurry temperature and a signal light could be utilized as well to indicate that the ceramic material is at its desired molding temperature.

The feed pipe 44 is heated with a separate heater comprising a flexible resistance heater 76 operated through a separate controller 77 to heat the pipe and make sure that the material in the pipe is in a slurry state so that it could be fed through the passageway 45 into the mold plate 21.

The temperature controllers of course will maintain the temperature at the desired level, by independently turning on and off the flexible heaters 41 and 76, respectively. The controller 70 can have an operating adjustment control 70A shown in FIG. 1 as well, and the controller 77 has an adjustment control 77A.

A mold or die indicated at 80, which is only schematically shown, provides a mold cavity 81 for making a suitable part and is supported over the mold fitting 21. The mold has an inlet opening 82 aligned with the passageway 45. As can be seen, the mold or die 80 is in two sections and can be suitably separated for getting the finished part out in a conventional manner. A special feature of the molds of the present invention is that the molds are water cooled having cooling passageways 83 formed at least the lower section of the mold, and water from a source indicated at 84 is circulated through the mold to cool the ceramic material.

When a part is to be molded the spring loaded cylinder 22 is permitted to retract, and the mold 80 can then be placed underneath the member 28 of the cylinder and aligned properly with the mold fitting 21 so that the aperture 82 and the passageway 45 align.

A manual switch 86 has two portions and as shown schematically in FIG. 1 and also as shown on the control panel 17, for manually controlling the pneumatic or air cylinder 22. By pushing one portion of the switch 86 a relay 87 is energized and locked on to hold a valve 88 in position to extend the rod 27 of the cylinder 22 and clamp the mold 80 tightly against the mold fitting 21. This can be released manually by pushing the other portion of switch 86 to break the circuit.

The water is turned on for circulation through the mold by suitable valves. The relay 87 continues to control the valve 88 to provide air under pressure to the cylinder 22 from an air source until it is released by another signal. Assuming that the temperatures are up to desired level in the tank portion 40, and in the feeder pipe 44, the molding cycle can be undertaken. The vacuum to the tank portion 40 is turned off, and by pushing a suitable switch the sequence for filling the mold will start.

An adjustable, two section timer 90 is used for controlling the time of various functions, and as shown in FIG. 5 the timer is energized by pushing a switch button 95. As long as the valve 88 has been powered from the manual switch 86 through the relay 87 the valve 92 is capable of being operated by the timer. If switch 86 has not energized the relay 87 and valve 88, valve 92 will not operate because interlock contacts controlled by relay 87 must first be closed. The valve 88 continues to be energized so the cylinder 22 holds the mold or die firmly in place.

Switch 95, which starts the timer, also controls valve 92 so that air under pressure is then introduced into the interior of the tank portion 40 under control of the timer 90 through valve 92. This air under pressure then forces the ceramic slurry out through the outlet 43 and to the feeder pipe 44, and then through the passageway 45 to enter into the interior of the mold cavity 81. The valve 92 is disabled by contacts being opened by one portion of timer 92 when the selected time period has expired.

The relay holds air under pressure continuously on the pneumatic cylinder 22, as shown by the top line 93 in FIG. 5. The valve 92 is operated for a time as indicated by the second line from the top 94 in FIG. 5. The air pressure to tank portion 40 is held on for a desired number of seconds, which is adjustable by setting a time adjustment button 95A. The time set is selected to insure that the cavity of mold 80 will be completely filled during the operating cycle.

In the form shown, the mold filling operation is intended to take approximately five seconds. The valve 92 relaxes and air is exhausted from the tank for a short duration such as a second and one-half or two seconds as shown by line 96 so that the interior of tank portion 40 then is under atmospheric pressure. The interior of tank portion 40 is connected to atmosphere through suitable ports in the valve 92. When the desired exhaust time has passed, a second portion of the timer operates contacts to cause the relay 87 to relax so that valve 88 moves to its exhaust position to exhaust the air under pressure from the pneumatic cylinder 22 and the cylinder 22 then retracts under spring load to release the mold or die 80. The safety shield 30 then can be pivoted to its open position (which disables the interlock and prevents air from being provided to the interior of the tank portion 40) and the mold or die 80 can be removed, opened, the part then removed and the mold replaced for a new cycle.

It should be noted that if desired the relay 87 also could be released by using a pressure sensor in tank 40 which continued to keep valve 88 energized as long as there was greater than atmospheric pressure in the tank.

A power switch 96 can be utilized for powering the motor 68 and the vacuum pump 71, and various indicators and dials can be further provided. The manual temperature control button 77A can be provided for individually controlling the temperature of the feeder pipe and a manual switch to control air pressure to the tank portion 40 also can be provided as shown at 98 for emergency release of pressure. The controls can be through suitable relays so that when the automatic cycle is in control, the manual switches will not be operable to provide air pressure to the tank portion 40 to insure that the ceramic material is not forced out through the feeder tube 44 when no die or mold is being held in place.

It should be noted that with the present arrangement, the conical tank portion 40 permits use of substantially all of the ceramic slurry material in the tank portion 40 without any waste in the corners so that small amounts of ceramic mix can be used without waste. Further if solid chunks are put into the tank before they are heated, starting the motor 68 to run the mixer paddle will not cause damage because of the torque limiting clutch 65 that will slip if the mixer paddle is prevented from rotation by a solid chunk of material. The motor 68 can be turned off until such time that the tank temperature is at a level that will permit operation. The sensor 74 for the slurry temperature is located so that it will accurately control the temperature of the slurry and prevent overheating and yet will keep the material in a slurry state. The individual control of the feeder pipe permits the feeder pipe to be kept at a different temperature if desired.

The interlock system makes sure that the air from the tank portion 40 is released before releasing the mold or die 80 by having the common timer actuate the valve to release air from the tank portion 40 and subsequently release the air pressure from the cylinder 22. The protective shield 30 prevents flash from causing a hazard with the operator. The interlock system insures that when the shield is open you can not start the molding process.

The use of a water cooled die as opposed to a water cooled table (which has been used before) insures that a single die can be used in a semi automatic process, and that with individual passageways located to cool the part specifically the process can be speeded up so that there is no need for providing two molds or dies. The driving of the mixer paddle or blade assembly from the bottom clears up the table top for other work, and makes the tank portion 40 much easier to load from the top. Further, the mixer paddle can be removed merely by using a "twist lock" coupling, and the tank portion 40 can easily be cleaned by removing the paddles for the mixer.

The tank portion 40 may be metal or stainless steel and the feeder pipe 44 may be stainless steel for example, standard, commercially available relays and temperature controllers are utilized.

Although the present invention has been described with reference to preferred embodiments, workers skilled in the art will recognize that changes may be made in form and detail without departing from the spirit and scope of the invention.

What is claimed is:

1. A low pressure ceramic molding machine comprising:

support including a table surface;

a molding tank mounted on said support and positioned below the table surface;

said tank including means to provide heat to the tank for heating materials in the tank and to cause ceramic materials to be heated to a level sufficient to maintain a slurry state;

means to provide fluid under a low pressure to the interior said tank to pressurize the interior of said tank and to cause ceramic material in a slurry state to be under pressure;

said tank having an outlet for permitting said ceramic material in a slurry state to be moved outwardly under such low fluid pressure in a molding cycle;

a conduit positioned exteriorly of the tank connected to said tank outlet and extending laterally from the tank to open to the table surface;

means to mount a die on said table surface, such die having a surface with an opening alignable with said conduit, whereby when the surface of such die and the table surface are held in contact ceramic material in a slurry state will be forced into such die when the tank is under pressure;

said means to mount a die including a die holder for holding such die comprising column means mounted on said support and positioned above said table surface adjacent such die and laterally offset from said tank;

a cross member mounted on said column means in position to overlie such die in place on the table surface and being spaced upwardly therefrom; and a fluid pressure cylinder mounted on said cross member and having an extendable and retractable rod and being adapted to exert a force to hold such die with a force toward said table surface to insure communication between the die opening and the conduit during the molding cycle.

2. In a low pressure ceramic molding machine, a tank, means to provide gaseous fluid under pressure to said tank, an outlet from said tank, means for connecting said outlet to a molding die, means for heating said tank to a level sufficient to maintain a ceramic material in a slurry state whereby ceramic material will be urged by the fluid pressure in the tank through said outlet and the means for connecting, the improvement comprising means to permit using substantially all the material in the tank without waste, the tank being formed to have a generally conical shaped interior surface along substantially its entire axial working length and having the outlet provided at a location to permit discharge of material from said tank, the means for connecting the outlet to the die offset from the central axis of the tank, means to support such a die at a position offset from the central axis of the tank, the means to connect comprising a conduit that has an end directed to be coupled to a die on the means to support, and the means to selectively provide gaseous fluid under pressure to the tank selectively providing pressure at a pressure level acting on the surface of the ceramic material therein sufficient to force such ceramic material through the outlet and the means to connect without movement of the material by a mechanical element.

3. The molding machine of claim 2 and a mixer member mounted for rotation about the central axis of the conically shaped tank, the mixer member having blades moving closely adjacent the tank side walls for a substantial distance therealong as the mixer member is rotated, said outlet being located adjacent the lower end of the conical tank.

4. The molding machine of claim 3, and a vacuum source, means to connect said vacuum source to the interior of the tank to selectively create a vacuum in said tank.

5. The molding machine of claim 2 and a molding die holder comprising a fluid pressure operated cylinder acting to hold the die on said machine in position communicating with the means for connecting said outlet to a molding die, said molding die holder comprising a fluid pressure operated cylinder exerting a force holding said molding die against said means for connecting.

6. The molding machine of claim 5 and means to control a sequence of fluid pressure to said cylinder and to said tank including means operable to provide fluid pressure to said cylinder during a molding cycle prior to the time that fluid pressure is supplied to said tank and also subsequently to the time when fluid pressure has been released from said tank.

7. The molding machine of claim 2 wherein the means to provide gaseous fluid pressure to said tank including adjustable timer means to control the time during which fluid pressure is provided to said tank to control the mold filling cycle.

8. The molding machine of claim 2 and a safety shield member adjacent the die, said safety shield member comprising an upright plate pivotally mounted between the means for connecting to a molding die and an operator using the molding machine, and being movable from an operable shielding position to a position wherein the molding die to accessible to an operator, and means to sense the position of said shield member and to prevent transfer of ceramic material through said means to connect if the shield member is not in a desired location.

9. In a low pressure ceramic molding machine, a tank, means to provide gaseous fluid under pressure to said tank, an outlet from said tank adjacent the lower end, means for connecting said outlet to a molding die, means for heating said tank to a level sufficient to maintain a ceramic material in a slurry state whereby ceramic material will be urged by the fluid pressure in the tank through said outlet and the means for connecting, the improvement comprising the tank being formed in generally conical shape along its axial working length to permit discharge of material from said tank, a mixer member mounted for rotation within the conically shaped tank, the mixer member having blades moving adjacent the tank side walls for a substantial distance therealong as the mixer member is rotated, and a drive shaft rotatably mounted adjacent the lower end of the tank, said drive shaft passing through the bottom of the tank and being rotatable along the axis of the conically shaped tank, a portion of the drive shaft extending into the tank and including releasable drive means to drive the mixer member.

10. The molding machine of claim 9 and a drive motor, means for drivably connecting said drive motor to said drive shaft on the exterior of said tank.

11. The molding machine of claim 10 wherein said means for drivably connecting comprises a torque limiting clutch means.

12. In a low pressure ceramic molding machine, a tank having a central upright axis, means to provide gaseous fluid under pressure to said tank, an outlet leading from said tank means for connecting said outlet to a molding die spaced laterally of said tank, means for heating said tank to a level sufficient to maintain a ceramic material in a slurry state whereby ceramic material will be urged by the fluid pressure in the tank through said outlet, the improvement comprising a mixer member mounted for rotation about the central axis of the tank, the mixer member moving closely adjacent the tank walls as it is rotated, a drive shaft rotatably mounted adjacent the lower end of the tank, said drive shaft passing through the bottom of the tank and being rotatable along the central axis of the tank, a portion of the shaft extending into the tank and including releasable drive means to drive the mixer member, said tank having an opening at the upper end thereof of size to permit said mixer member to be disengaged from the releasable drive 13. The molding machine of claim 12 and a drive motor and torque limiting clutch means for drivably connecting said drive motor to said drive shaft on the exterior of said tank.

14. The molding member of claim 13 wherein said tank is conically shaped and the smaller end of the cone is toward the bottom.

15. The molding machine of claim 12 wherein said means to provide fluid pressure of said tank includes timer control means to maintain fluid pressure in said tank for a desired time for filling a mold at the outlet.

16. The molding machine of claim 15 and means to retain a mold in place at said outlet, and control means to maintain said means to retain in a mold retaining position once fluid pressure has been applied to said tank until the fluid pressure in said tank has reduced substantially to atmospheric pressure.

17. A low pressure ceramic molding machine comprising:

support including a table surface;

a molding tank mounted on said support and positioned below the table surface;

said tank including means to provide heat to the tank for heating materials in the tank and to cause ceramic materials to be heated to a level sufficient to maintain a slurry state;

means to provide fluid under a low pressure to the interior said tank to pressurize the interior of said tank and to cause ceramic material in a slurry state to be under pressure;

said tank having an outlet for permitting said ceramic material in a slurry state to be moved outwardly under such low fluid pressure in a molding cycle;

a conduit positioned exteriorly of the tank connected to said tank outlet and extending laterally from the tank to open to the table surface;

means to mount a die on said table surface, such die having a surface with an opening alignable with said conduit, whereby when the surface of such die and the table surface are held in contact ceramic material in a slurry state will be forced into such die when the tank is under pressure;

said means to mount a die including a die holder for holding such die comprising a pair of upright columns mounted on said support and positioned above said table surface on opposite sides of such die and laterally offset from said tank;

a cross member mounted on said columns overlying such die in place on the table surface and being spaced upwardly therefrom; and a fluid pressure cylinder mounted on said cross member and having an extendable and retractable rod extending downwardly toward such die and adapted to exert a force to hold such die with a downward force relative to said table surface to insure communication between the die opening and the conduit during the molding cycle.

18. The molding machine specified in claim 17 and means to adjust the position of said cross member on said upright columns to permit the fluid pressure cylinder to be adjusted in height relative to the die which it is holding.

19. The molding machine of claim 17, and a safety shield member comprising:

a transparent plate mounted above said table surface about a pivot generally parallel to the table surface and adjacent to one side and one edge of said plate;

said plate being mounted in an operable position extending substantially upright from said table surface and in position between the molding die and an operator of the molding machine, and being movable about said pivot to a second position wherein the shield member permits access to the molding die; and means for sensing the position of said plate and for preventing material from being transferred to a die held by the fluid pressure cylinder, unless the shield member is in operable position.

* * * * *

UNITED STATES PATENT AND TRADEMARK OFFICE

CERTIFICATE OF CORRECTION

PATENT NO. : 4,416,603

DATED : November 22, 1983

INVENTOR(S) : Michael I. Peltsman et al.

It is certified that error appears in the above-identified patent and that said Letters Patent is hereby corrected as shown below:

Column 6, line 55, (Claim 1, line 3), before "support" insert --a--; Column 6, line 63, (Claim 1, line 11), before "said" insert --of--. Column 7, lines 42 and 43, (Claim 2, lines 19 and 20), after "to" (second occurrence) delete --selec-tively--. Column 8, line 17, (Claim 8, line 7), "to" should be --is--. Column 8, line 68, (Claim 12, line 20), after "drive" insert --means and removed from the tank.--. Column 9, line 20, (Claim 17, line 3), before "support" insert --a--; Column 9, line 28, (Claim 17, line 11) before "said" insert --of--.

Signed and Sealed this

*Fifth* Day of *June 1984*

[SEAL]

*Attest:*

GERALD J. MOSSINGHOFF

*Attesting Officer* *Commissioner of Patents and Trademarks*